Dec. 9, 1952     N. S. BLAYDES     2,620,817
UNLOADING ADAPTER
Filed June 20, 1947
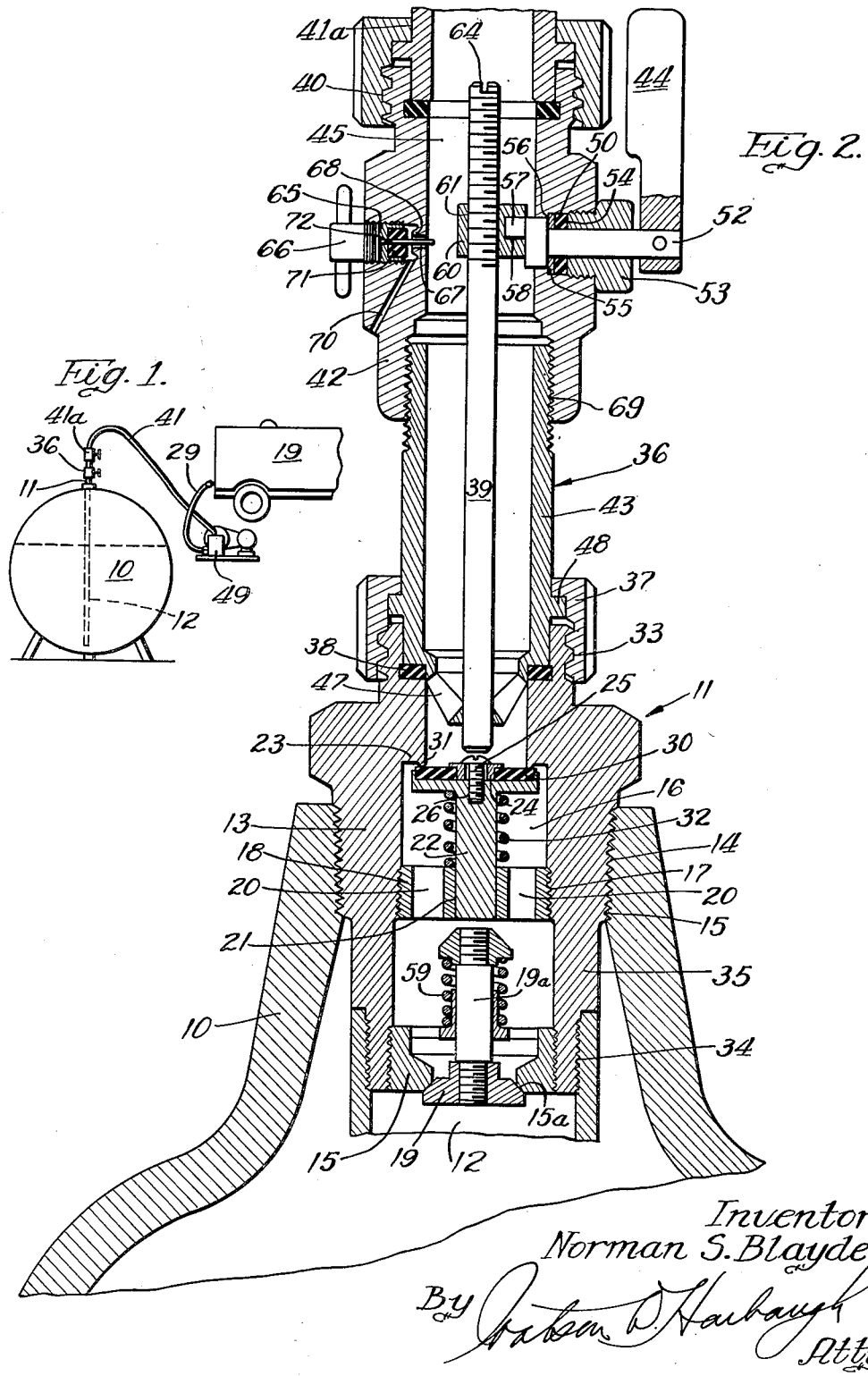
Inventor:
Norman S. Blaydes,
By [signature] Atty.

Patented Dec. 9, 1952

2,620,817

UNITED STATES PATENT OFFICE 2,620,817

UNLOADING ADAPTER

Norman S. Blaydes, Phoenix, Ariz., assignor to The Bastian-Blessing Company, Chicago, Ill., a corporation of Illinois Application June 20, 1947, Serial No. 755,997

2 Claims. (Cl. 137—322)

This invention relates generally to valves and more particularly to an apparatus or fitting for use in conjunction with a filler check valve installed on a container for fluid stored under pressure in both its liquid and vapor phases, the fitting being used when it is desired to empty the container of fluid.

Liquefied gases such as liquefied petroleum gas products, which are extensively used in rural areas as gaseous fuels, are commonly stored in the liquid phase in underground tanks. These tanks are connected through a pressure reducer to a service line supplying gaseous fuel to various gas consuming appliances, the liquid vaporizing either in the tank or when the pressure is reduced. Periodically the supply of liquid fuel in the tank is replenished, usually from a tank truck which conveys gas from a distribution station to the user's premises.

Not infrequently it is necessary to empty such storage tanks for purposes of replacement of the tank, cleaning, or removal of the accumulation of heavy nonvolatile ends. The emptying of such tanks is either a hazardous or long time consuming procedure if special equipment has not been built into the tank.

These storage tanks are generally provided with a spring loaded check valve in the filling connection which prevents the backflow of fluid through the filling fitting. Consequently, in order to empty a tank either the service line or some other conduit means must be employed. Since the service line is generally of smaller diameter than the fill line, emptying is considerably slowed up. Furthermore, the service line must be disconnected and adaptors used to connect it to the hose or other conduit leading to a pump and the container into which the fluid is to be transferred.

One object of this invention is, therefore, to provide a fitting which may be connected to the conventional filler check valves usually provided on storage tanks, which fitting has a manually operated member for opening the check valves to allow fluid to flow out of the tank through the filling conduit and thence through a conduit to the pump.

Another object is to provide a removable fitting which may be connected between the filler valve and a conduit leading to the pump, the fitting having a relatively large cross section passage therethrough for the passage of fluid.

Another object is to provide a fitting having a bleeder valve for indicating whether or not the fitting contains fluid under pressure, the valve also to be used prior to disconnecting said fitting from the storage tank and conduit to safely vent pressure from inside the fitting.

Another object is to provide an unloading fitting having a reciprocable member for forcing open the filler check valve, the reciprocable member being driven through an eccentric or crank from a rotatable handle in order that the initial force available for opening the valve has a greater magnitude than that available during the remainder of the opening stroke.

A further object is to provide a fitting which may be employed to empty a tank of either liquid or gas and which may be manufactured largely by automatic screw machine operations.

Other and additional objects and advantages of this invention will occur to those familiar with the art on reading the following specification in conjunction with the drawing and the appended claims.

In the drawing:

Fig. 1 is a perspective view showing the manner in which the fitting of this invention is connected to a storage tank for the purpose of transferring fluid from this tank to a tank truck.

Fig. 2 is an enlarged vertical section of the apparatus of this invention connected to a conventional filler valve on a storage tank.

A container 10 for a fluid such as liquefied petroleum gas stored under pressure in both its liquid and vapor phases is provided with a filler check valve 11 as shown in Fig. 2.

A typical storage tank and its associated apparatus is disclosed in United States Patent No. 2,361,866, issued October 31, 1944, to H. L. Norway, reference to which is hereby made. However, for the purposes of illustration, a simple tank 10 provided with a filler valve 11 having a tube 12 extending to a point adjacent the bottom of the tank 10 below the liquid level is sufficient. The service conduit and vapor return connection which ordinarily would also be installed in the tank have, therefore, not been shown. A common practice is to provide a multi-purpose fitting or head on a standpipe opening into the tank, which head is usually provided with a service line connection and shutoff valve, a liquid level gauge, a vapor return connection, and a filler valve.

In the embodiment illustrated, the filler check valve 11 comprises a body 13 provided with external threads 14 for supporting it in an opening in the top of the container 10. A passage 16 extends through the body 13 connecting the top of the valve 11 with the inside of the container 10. The body 13 is internally threaded as at 17 to receive a disc-like member 18 which is provided with a plurality of holes 20 for the passage of gas therethrough.

An axial hole 21 supports the lower end of the valve member 22, sufficient clearance being provided so that the member 22 is freely movable vertically in the hole 21. The member 22 is mushroom shape, the upper end being hollowed out to receive a valve disc 30. This annular disc 30 is secured to the member by a collar 24 and a screw 25 received in a tapped hole 26 in the top of the member 22.

An internal shoulder 23 is provided in the passage 16 and a valve seat 31 is machined on its lower face. A spring 32 bearing against the disc member 18 and the valve member 22 urges the valve disc 30 towards the seat 31 to seal the passage 16 except when the member 22 is forced away from the seat 31.

The lower portion 35 of the body 13 receives a valve seat element 15 which also serves to support a second check valve member 19. This valve member is carried by a stem 19a which is movably supported by the element 15. A spring 59 acts against the upper end of the stem 19a and urges the valve member 19 toward a conical seat 15a on the lower face of the element 15. The upper end of the stem 19a is in close proximity with the lower end of the member 22 so that when the upper valve member 22 is forced open it strikes the top of the stem 19a and moves the lower member 19 away from its seat 15a.

The upper end of the body 13 is provided with an acme thread 33 to which the filling hose coupling is normally attached. When this hose (not shown) is attached and fluid is forced through it under pressure, its pressure serves to move the member 22 away from the seat 31 compressing the spring 32. Fluid then flows through the dip pipe 12 extending to a point near the bottom of the tank 10. This pipe 12 is secured to threads 34 provided on the lower portion 35 of the body 13.

When it is desired to empty the tank 10, the unloading adaptor fitting 36 is attached to the top of the check valve 11 as shown in the drawing. The threaded collar 37 is screwed onto the threads 33, a pressure tight seal being formed by a gasket 38. A conduit 41, provided with a shutoff valve 41a and leading to a pump 49 is connected to the upper end of the fitting 36. From the pump 49 a second conduit 29 extends to a tank truck 19 as shown in Fig. 2.

The unloading fitting 36 comprises a body portion 42, a cylindrical extension member 43, and an actuator rod 39. The function of the rod 39 is to force the valve member 22 away from its seat 31 and allow fluid to flow out of the container 10 when a handle 44 is rotated 180° from its resting position.

The body 42 is preferably machined from a piece of hexagonal rod in order to utilize two opposite flat sides. The center of the body 42 is drilled out to form a cylindrical passage 45 which is substantially the same diameter as a similar passage in the member 43. The upper end of the member 43 is provided with pipe threads 69 for securing it to the body 42.

The lower end of the member 43 is of a smaller diameter than the remainder of the member 43 and is receivable inside the top of the check valve 11 when the adaptor 36 is connected thereto. An axial hole extends through the end of the member 43 and slidably supports the lower end of the rod 39. A plurality of inclined holes 47 also extend through the end of the member 43 to provide open passages for fluid.

A shoulder 48 is machined on the lower end of the member 43 so that the member 43 may be tightened against the gasket 38 to form a seal, the collar 37 bearing against the shoulder 48.

The body 42 is provided with a threaded hole 50 extending through a side wall thereof for the purpose of receiving an eccentric shaft 52 which carries the handle 44. A threaded gland bushing 53 is screwed into the hole 50 having an axial hole for the shaft 52. An annular ring of packing 54 is between the bushing 53 and a washer 55, supported by a shoulder 56, to effect a pressure tight seal about the shaft 52.

The inner end of the shaft 52 is provided with a projection 57 displaced from the axis of the shaft 52. This projection 57 is received in a horizontal slot 58 milled into the side wall of a member 60. A pair of lugs (not shown) ride in grooves provided in the side wall of the cylindrical passage 45 to support the member 60 against rotation and maintain it in proper alignment with respect to the shaft 52.

The rod 39 is threaded at its upper end, for purposes of adjustment, and screwed into a threaded hole 61 in the member 60. Thus rotation of the handle 44 is transformed by the eccentric action of the shaft 52 to a reciprocating motion of the rod 39. As the handle 44 is rotated from the position shown in the drawing, the projection 57 moves downwardly carrying the rod 39 with it.

The position of the rod 39 with respect to the member 60 and the adaptor 36 may be varied by screwing the rod 39 in the threads 63, a screwdriver slot 64 being provided in the upper end of this rod for this purpose. This adjustment makes it possible to adapt the fitting 36 to various types of check valves.

A threaded hole 65 is provided in the body 42 preferably at a point diametrically opposite to the handle 44. This hole receives a bleeder valve member 66. A smaller diameter hole 67 extends from the bottom of the hole 65 to the passage 45. This hole 67 is surrounded by a raised outwardly facing valve seat 68. An inclined passage 70 through the body 42 connects the bottom of the hole 65 with the atmosphere. The inner end of the valve member 66 is hollowed out to receive a valve disc 71 which coacts with the seat 68 to seal the hole 67 when the member 66 is screwed up tight. A small diameter pin 72 supported in the member 66 extends through the disc 71 into the passage 67 and serves to prevent this passage from becoming clogged with foreign particles.

When the unloading fitting 36 has been connected to the filler valve 11 and to the conduit 41 leading to the pump 49 for drawing fluid out of the tank 10, the operation of the apparatus is as follows: The operator turns the handle 44 through 180°, the projection 57 moving the member 60 and rod 39 downwardly until the lower end of the rod 39 strikes the top of the screw 25 and forces the valve member 22 downwardly overcoming the tank pressure as well as that of the spring 32 and moving the valve disc 23 away from its seat 31. As the valve member 22 moves downwardly it forces the lower valve member 19 away from its seat and opens the interior of the container 10 to the conduit 41. When the valve 41a in the conduit 41 is opened, the operator starts the pump 49, which draws fluid upwardly through the pipe 12 from the bottom of the tank 10, the fluid flowing past the opened valve member 22 through the apparatus 36 to the conduit 41.

If the liquefied product such as liquefied petroleum gas is being emptied from the tank 10, the bleeder valve 66 may be employed to determine when the tank 10 is empty of liquid. If liquid is flowing through the fitting 36 and this valve 66 is opened slightly, a stream of liquid will flow out of the passage 70, but only gas will escape if the tank 10 has been emptied of liquid.

When the tank 10 has been emptied, the operator shuts off the pump 49 and closes the valve 41a in the conduit 41. He then moves the handle 44 to the position shown in Fig. 2, moving the rod 39 upwardly and allowing the valve member 22 to reseat itself. The bleeder valve 66 is then opened and the pressure of gas trapped in the fitting 36 is allowed to dissipate itself into the atmosphere. It the event that the check valve 11 or the conduit valve is not properly closed, the continuing flow of gas through the bleeder valve beyond the time necessary to empty the chamber formed within the fitting 36 will indicate to the operator that one of these valves has not been closed, and serve to warn him that it is unsafe to proceed to uncouple the conduit 41 from the fitting 36 or to disconnect the fitting 36 from the check valve 11.

The use of an eccentric linkage to convert rotary motion of the handle 44 to longitudinal motion of the rod 39 results in a particular advantage. The force required to open a positively seating check valve against pressure is greatest during the first stages of opening when the valve member must be moved against the fluid pressure. As soon as the valve is opened slightly the back pressure of fluid which has passed around the sides of the valve counteracts the pressure tending to hold the valve closed so that the force required to open the valve diminishes as the valve is opened. Since an eccentric linkage develops the greatest force at the start of a stroke when it moves away from the dead-center position, in the embodiment illustrated the greatest force to open the valve member is produced at the start of the handle's motion when the resistance against opening is the greatest. Consequently it is important that the adjustment provided by the threads 61 be available so that the rod 39 may be turned down to a position just touching the valve member 22 at the starting position of the stroke in order to take advantage of the greatest force available.

By permitting the handle 44 to turn through a full 180°, extra force is available at the full open end of the stroke when the force to compress the spring 32 is greatest.

The fitting of this invention is purposely constructed with matching threads and coupling arrangements, top and bottom, so that it may be readily connected to standard filling conduits or hoses carried by a distributor's tank truck whenever it becomes necessary to empty a container of liquefied petroleum gas.

In some embodiments it has been found desirable to provide a detent or other means to hold the handle 44 in the open position but usually the friction of the packing 50 has proved sufficient. Various other changes and modifications to the embodiment of this invention described above such as those necessary to adapt it to various types of filler valves or multi-purpose heads will present themselves to those familiar with the art and may be made without departing from the spirit of this invention whose scope is commensurate with the following claim.

What is claimed is:

1. A fitting comprising an elongated body having a passageway extending through said body, means at one end of the body for quick releasable attachment to a check valve, the other end of the body having an opening in communication with the passageway, a rod in said passageway having substantially the same length as the body, means adjacent said one end of the body for slidably supporting one end of the rod at the center of the passageway, a shaft journalled in the side of said body and extending therethrough in sealed relationship, an eccentric projection on the inner end of the shaft movable in a circular path whose plane is parallel with the direction of elongation of the body, a reciprocable member having a threaded opening slidably mounted for movement lengthwise in said passageway near said shaft, said reciprocable member having a slot in its side receiving said projection, which slot is disposed in the plane of said circular path and extending crosswise of the axis of the threaded opening, the other end of said rod being threaded and received in said threaded opening and extending beyond said reciprocable member, said rod being thereby adapted for adjustment through said other open end for quick adjustment between said rod and said member to vary at will the position of said one end of the rod with respect to said one end of the body with the projection remaining in its position in said circular path nearest said other end of the body, and means on the outside end of said shaft for rotating the eccentric projection from its position nearest said other open end to drive said one end of the rod a predetermined distance with a varying force that is initially great as the projection is moved from its said position nearest said other end of the body along its circular path to a position nearest said one end of the body.

2. An unloading adaptor fitting for removable coupling on filling connections for unloading containers under pressure whose filling connections have a back flow check valve in them, said adaptor fitting comprising an elongated body made of two parts and having a passageway therethrough, coupling means at one end of the body, coupling means at the other end of the body for releasable attachment to a filling connection, one of said coupling means being a female member and the other coupling a male member capable of cooperation with each other in a coupling assembly when free to do so, a valve actuating rod threaded at one end disposed in said passageway, guide means for slidably and rotatably supporting the rod at said other end of the body, a reciprocable member slidably mounted in the passage and having a threaded opening therein receiving the threaded end of the rod beyond which the threaded end of the rod is exposed and the rod is thereby adapted for adjustment through said one open end, a shaft journalled in the side of said body and extending into said passageway adjacent said reciprocable member, an eccentric projection upon the shaft engaging the reciprocable member for reciprocating the member, and means on the outside end of said shaft for rotating same to cause said member to move the end of the rod a predetermined distance beyond said guide means, the relative position of said rod with respect to said other end of the body being adjusted at will through said one open end of the body at a dead center position of said eccentric projection nearest to said one open end whereby the adjustment of the rod can be made without effecting movement of said reciprocable member in said dead center position of the eccentric projection.

NORMAN S. BLAYDES.

REFERENCES CITED

The following references are of record in the file of this patent:

UNITED STATES PATENTS

| Number | Name | Date |
| --- | --- | --- |
| 280,137 | Cooper | June 26, 1883 |
| 777,517 | Kellogg | Dec. 13, 1904 |
| 927,593 | Phillipson | July 13, 1909 |
| 1,170,813 | Hennessy | Feb. 8, 1916 |
| 1,686,152 | Garrott | Oct. 2, 1928 |
| 2,017,317 | Magney | Oct. 15, 1935 |
| 2,035,202 | Smith | Mar. 24, 1936 |
| 2,044,633 | Poor | June 16, 1936 |
| 2,194,501 | Hooper et al. | Mar. 26, 1940 |
| 2,326,187 | White | Aug. 10, 1943 |